United States Patent

Tabata

[19]

[11] Patent Number: 6,076,422
[45] Date of Patent: Jun. 20, 2000

[54] STRUCTURE FOR CONTROLLING DISPLACEMENT OF VEHICLE PEDAL

[75] Inventor: Mitsuhiro Tabata, Nishikamo-gun, Japan

[73] Assignee: Toyota Jidosha Kabushiki Kaisha, Toyota, Japan

[21] Appl. No.: 09/234,377

[22] Filed: Jan. 21, 1999

[30] Foreign Application Priority Data

Feb. 4, 1998 [JP] Japan .................................. 10-023532

[51] Int. Cl.[7] ............................... G05G 1/14; B60T 7/06
[52] U.S. Cl. ........................... 74/512; 296/189; 280/784; 188/377; 180/274
[58] Field of Search ..................... 74/512, 560; 188/377; 180/274, 275; 477/197; 280/750, 752, 784; 296/189

[56] References Cited

U.S. PATENT DOCUMENTS

| | | | |
|---|---|---|---|
| 5,462,502 | 10/1995 | Lin | 477/197 |
| 5,615,749 | 4/1997 | Kato | 180/274 |
| 5,685,200 | 11/1997 | Baumann | 188/377 |
| 5,778,732 | 7/1998 | Patzelt et al. | 74/512 |
| 5,848,558 | 12/1998 | Isono et al. | 180/274 |
| 5,848,662 | 12/1998 | Sakaue | 180/274 |
| 5,921,144 | 7/1999 | Williams, Jr. et al. | 74/512 |
| 5,970,817 | 10/1999 | Ichiba | 74/512 |
| 5,996,440 | 12/1999 | Nawata et al. | 74/512 |
| 6,006,626 | 12/1999 | Notake et al. | 74/512 |

*Primary Examiner*—David A. Bucci
*Assistant Examiner*—Chong H. Kim

*Attorney, Agent, or Firm*—Oliff & Berridge, PLC

[57] ABSTRACT

A structure for controlling the displacement of a vehicle pedal comprising: a pedal bracket fixed to a first vehicle body structural member which displaces in substantially the rearward direction of a vehicle when an external force of a predetermined value or more acts on the front portion of the vehicle; a suspended-type vehicle pedal which is swingably supported by the pedal bracket and which is provided with a treading surface at the bottom end thereof to which a treading force is applied by the foot of the driver; a treading force transmission member which transmits the treading force applied to the treading surface of the vehicle pedal towards a hydraulic conversion device; a linking device for linking the vehicle pedal and the treading force transmission member, which has a center of rotation of the link which is independent of the center of rotation of the vehicle pedal, and which presses the treading force transmission member, which is rotationally displaced around the center of rotation of the link in accordance with the swinging of the vehicle pedal, in the direction in which the pedal is operated when a treading force is applied to the treading surface of the vehicle pedal; and a displacement control device, which is supported at a second vehicle body structural member which is disposed further towards the rear of the vehicle than the first vehicle body structural member and whose rigidity in the longitudinal direction of the vehicle is higher than that of the vehicle body structural member, which relatively presses the linking device in the direction in which the pedal is operated through the relative displacement which arises between the first vehicle body structural member and the second vehicle body structural member, thereby displacing the treading surface of the vehicle pedal substantially towards the front of the vehicle.

21 Claims, 5 Drawing Sheets

STRUCTURE FOR CONTROLLING DISPLACEMENT OF VEHICLE PEDAL

BACKGROUND OF THE INVENTION

1. Field of the Invention

The present invention relates to a structure for controlling the displacement of a vehicle pedal.

2. Description of the Related Art

Conventionally, various structures have been proposed as counter-measures in the event that an external force of a predetermined value or more acts on the front portion of a vehicle. An example of these counter-measures is the structure disclosed in Japanese Utility Model Patent Application Laid-Open (JP-U) No. 1-73464.

Figure 5:
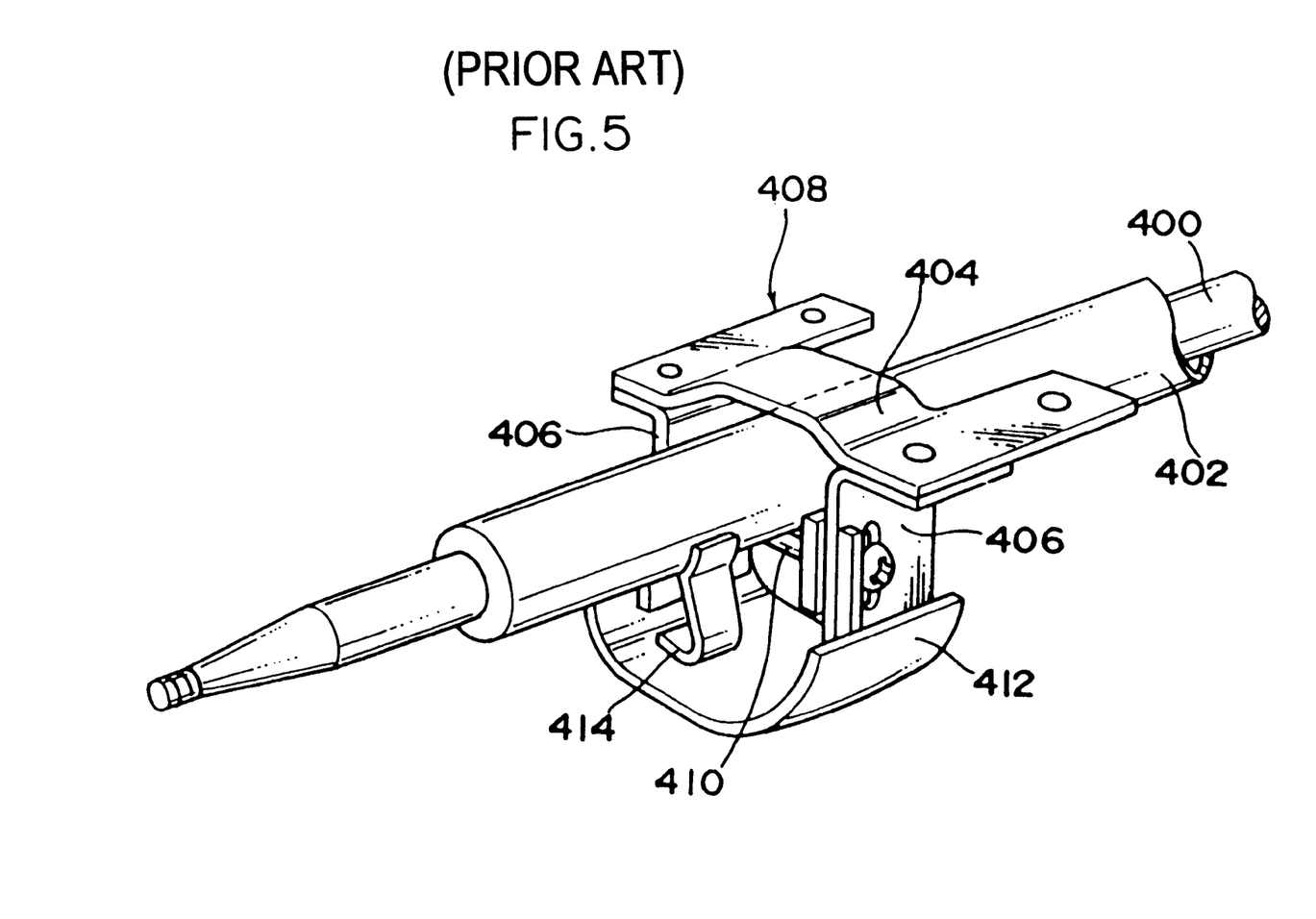
FIG. 5 is a perspective view illustrating a conventional structure.

The structure disclosed in JP-U No. 1-73464 will be described hereinafter. As illustrated in FIG. 5, in the structure disclosed in JP-U No. 1-73464, a steering column 402 which covers a steering shaft 400 is supported at a vehicle body by a tilt bracket 408 and a shaft 410. The tilt bracket 408 is formed from an upper plate member 404 and a pair of side plate members 406. The shaft 410 passes through the side plate members 406 and supports the lower side of the steering column 402.

Below the above-described tilt bracket 408 is disposed an elastically deformable knee protector with a substantially circular arc-shaped surface. This knee protector 412 is elastically supported at the bottom side of the steering column 402 via an elastically deformable stay 414.

According to the above-described structure, when an external force of a predetermined value or more acts on the front portion of a vehicle, the occupant of the vehicle is moved by inertia towards the front of the vehicle. Accompanying this, the legs of the occupant of the vehicle are bent from the knees and are moved by inertia towards the front of the vehicle. Therefore, if there were no knee protector 412 disposed in the vehicle, the possibility would exist that the legs of the occupant may come into contact with the tilt bracket 408. However, if the knee protector 412 is disposed under the tilt bracket 408, as is described above, then the knees of the occupant come into contact with only the knee protector 412.

While a structure where this type of knee protector 412 is provided may be considered a significant countermeasure when an external force above a predetermined value acts on the front portion of the vehicle, it is possible to look at countermeasures for protecting the legs of the vehicle occupant from other viewpoints. It is also important that these viewpoints include several forms of countermeasures for protecting the legs of the vehicle occupant which are effected in order to provide multiple levels of protection for the legs of the vehicle occupant.

The present inventors conceived of the idea of the present invention from these viewpoints, conducted various experiments, and arrived upon extremely effective counter-measures to control the displacement of a vehicle pedal when an external force of a predetermined value or more acts on the front portion of a vehicle, by focusing on the deformation and the displacement behavior of body panels and the like when such an external force is applied.

SUMMARY OF THE INVENTION

In view of the aforementioned, it is an object of the present invention to provide a structure for controlling the displacement of a vehicle pedal which can control the displacement of the treading surface of a vehicle pedal when an external force of a predetermined value or more acts on the front portion of a vehicle.

A first aspect of the present invention is a structure for controlling the displacement of a vehicle pedal comprising: a pedal bracket fixed to a first vehicle body structural member which displaces in substantially the rearward direction of a vehicle when an external force of a predetermined value or more acts on the front portion of the vehicle; a suspended-type vehicle pedal which is swingably supported by the pedal bracket and which is provided with a treading surface at the bottom end thereof to which a treading force is applied by the foot of the driver; a treading force transmission member which transmits the treading force applied to the treading surface of the vehicle pedal towards a hydraulic conversion means; linking means for linking the vehicle pedal and the treading force transmission member, which has a center of rotation of the link which is independent of the center of rotation of the vehicle pedal, and which presses the treading force transmission member, which is rotationally displaced around the center of rotation of the link in accordance with the swinging of the vehicle pedal, in the direction in which the pedal is operated when a treading force is applied to the treading surface of the vehicle pedal; and displacement control means, which is supported at a second vehicle body structural member which is disposed further towards the rear of the vehicle than the first vehicle body structural member and whose rigidity in the longitudinal direction of the vehicle is higher than that of the first vehicle body structural member, which relatively presses the linking means in the direction in which the pedal is operated through the relative displacement which arises between the first vehicle body structural member and the second vehicle body structural member, thereby displacing the treading surface of the vehicle pedal substantially towards the front of the vehicle.

A second aspect of the present invention is a structure for controlling the displacement of a vehicle pedal according to the first aspect of the present invention wherein: the structure for controlling the displacement of a vehicle pedal is a pressing member supported at the second vehicle body structural member and wherein; the direction of the action of the pressing force between the linking means and the pressing member changes in accordance with the rotational displacement of the linking means around the center of rotation of the link which is caused by the linking means being relatively pressed by the pressing member.

A third aspect of the present invention is a structure for controlling the displacement of a vehicle pedal according to the first and second aspects of the present invention wherein: a moving member is supported at the pedal bracket which moves in accordance with the swinging of the vehicle pedal; a fixed member is fixed at the second vehicle body structural member so as to cause a predetermined operation using the movement of the moving member and wherein; the structure for controlling the displacement of a vehicle pedal is structured so that, when a relative displacement arises between the first vehicle body member and the second vehicle body member thereby causing the moving member and the fixed member to interfere with each other, at least one of the moving member and the fixed member is capable of deforming.

A fourth aspect of the present invention is a structure for controlling the displacement of a vehicle pedal according to the first through third aspects of the present invention wherein: the linking means comprises a first link which has the center of rotation of the link in either the pedal bracket or in the first vehicle body structural member and which is linked so as to be rotatable relative to the treading force transmission member, and a second link which links the first link rotatably to the vehicle pedal, and wherein the linking means comprises a regulating means for preventing the first link from being rotationally displaced in the reverse direction to that in which the pedal is operated when a relative displacement arises between the first vehicle body structural member and the second vehicle body structural member.

The operation of the first aspect of the present invention is described below. In normal operation of a vehicle pedal, the pedal is swung in substantially the forwards direction of the vehicle around the center of rotation of the pedal by a treading force applied to the treading surface of the pedal. When the vehicle pedal swings, a linking means, which has a center of rotation of the link which is independent of the center of rotation of the pedal, is rotationally displaced around the center of rotation of the link in accordance with the swinging of the vehicle pedal. The treading force transmission member, which is the other member linked to the linking means, is thus pressed in the direction in which the pedal is operated, and the treading force thus imparted is transmitted to the hydraulic conversion means.

When an external force of a predetermined value or more acts on the front portion of the vehicle, the first vehicle body structural member is displaced substantially towards the rear of the vehicle. Consequently, the pedal bracket fixed to the first vehicle body structural member is also displaced substantially towards the rear of the vehicle. In response to this, because the rigidity in the longitudinal direction of the second vehicle body structural member, which is disposed substantially to the rear of the first vehicle body structural member, is higher than the rigidity of the first vehicle body structural member, there is hardly any displacement of the second vehicle body structural member towards the rear of the vehicle. Therefore, a relative displacement arises between the first vehicle body structural member and the second vehicle body structural member.

In the present invention, when a relative displacement arises between the first vehicle body structural member and the second vehicle body structural member, the aforementioned linking means is relatively pressed in the direction in which the pedal is operated by the displacement control means. Accordingly, the treading surface of the vehicle pedal is displaced substantially towards the front of the vehicle.

In accordance with the second aspect of the present invention, the displacement control means is the pressing member supported at the second vehicle body structural member. The pressing member relatively presses the linking means thus causing the linking means to be rotationally displaced around the center of rotation of the link of the linking means. Consequently, the direction in which the pressing force acts between the linking means and the pressing member changes. Therefore, the pressing force which acts from the pressing member to the linking means, and the pressing force which acts from the linking means to the pressing member (and, in turn, the second vehicle body structural member) can be optionally controlled.

According to the third aspect of the present invention, a moving member is provided at the vehicle pedal to move in accordance with the swinging of the vehicle pedal and a fixed member is fixed to the second vehicle body structural member to conduct a predetermined operation which uses the movement of the moving member. As mentioned above, when a relative displacement arises between the first vehicle body structural member and the second vehicle body structural member, the moving member and the fixed member are in a positional relationship where they interfere with each other.

At this point, when the moving member and the fixed member interfere with each other, because at least one of the moving member and the fixed member is constructed so as to be capable of deforming, the load which acts at the time of the mutual interference is absorbed by the deformation.

In accordance with the fourth aspect of the present invention, the linking means comprises a first link which has a center of rotation of the link in either the pedal bracket or the first vehicle body structural member and which is linked so as to be rotatable relative to the treading force transmission member, and a second link which links the first link rotatably with the vehicle pedal.

At this point, in the present invention, as was mentioned above, when a relative displacement arises between the first vehicle body structural member and the second vehicle body structural member, a regulating means is provided for preventing the first link from being rotationally displaced in the reverse direction to that in which the pedal is operated. Therefore, the linking means which comprises a first link and a second link can be prevented from rotationally displacing away from its normal operating direction (namely, in the reverse direction to that when the pedal is depressed by a driver).

DESCRIPTION OF THE PREFERRED EMBODIMENTS

Figure 1:
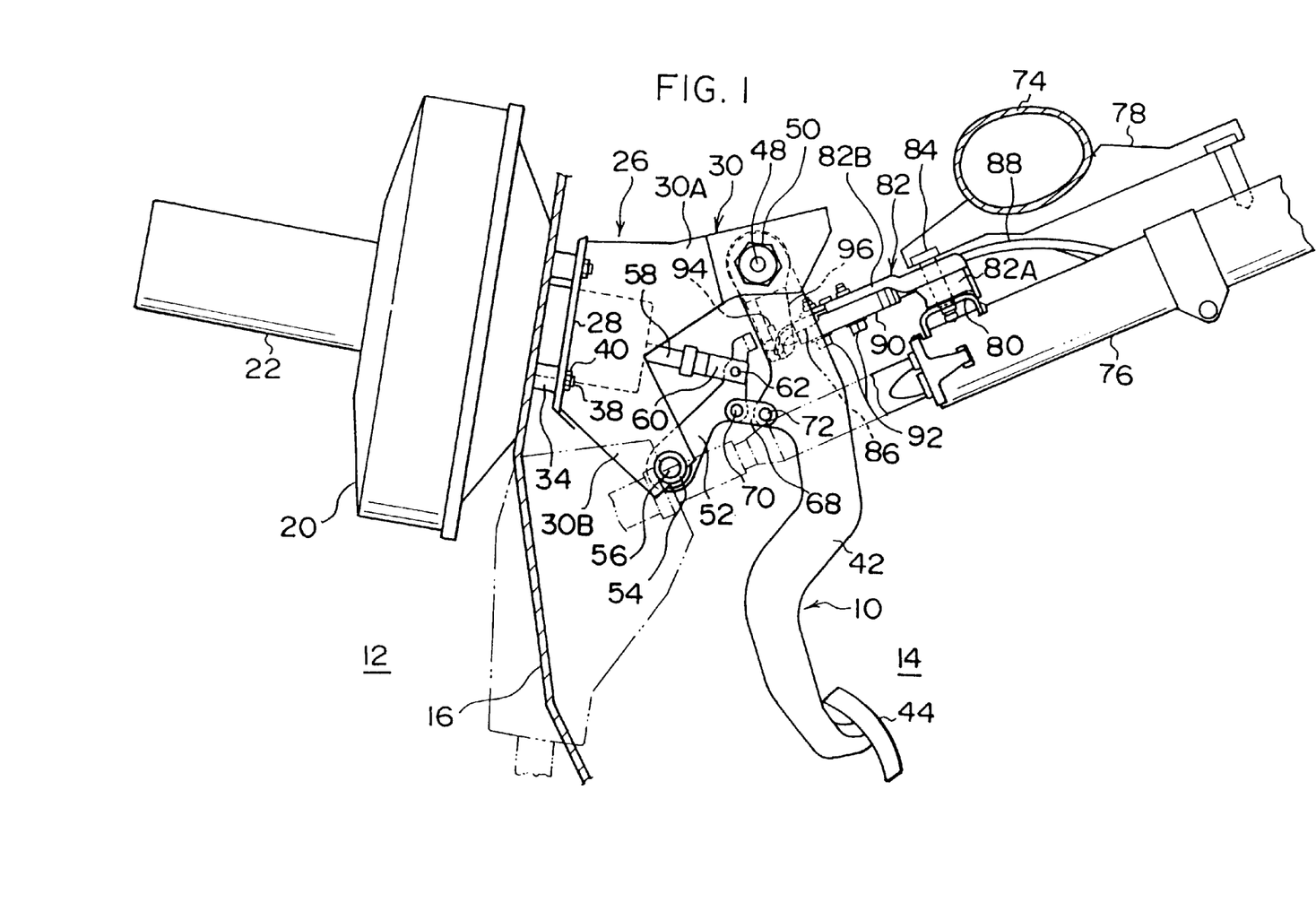
FIG. 1 is a side view illustrating an overall construction of a structure for controlling displacement of a vehicle pedal of an embodiment of the present invention.

The structure of the periphery of a suspended-type brake pedal 10 serving as a vehicle pedal is shown schematically in FIG. 1. Hereinafter, the overall composition of the peripheral structure including the brake pedal 10 is explained using the figures.

In a position bounded by the engine room 12 and the vehicle interior space 14, a dash panel 16, serving as the first vehicle body structural member, is disposed in a substantially vertical alignment. The top end portion of the dash panel 16 is fixed by spot welding or the like to an unillustrated cowl inner panel which forms a portion of the cowl and which is disposed in such a way that the longitudinal direction thereof is substantially the transverse direction of the vehicle. The bottom end portion of the dash panel 16 is fixed by spot welding or the like to an unillustrated floor panel.

On the side of the above-described dash panel 16 which is nearer to the front of the vehicle are disposed a brake booster 20, a master cylinder 22, and an unillustrated reservoir tank. The brake booster 20 functions as a means for augmenting the treading force which the driver is able to apply with his foot to the brake pedal 10. The master cylinder 22 functions as a means for converting the pressure which has been augmented by the brake booster 20 into hydraulic pressure. The reservoir tank stores and replenishes brake fluid in accordance with the volume of the hydraulic pressure system. It should be noted that the brake booster 20 and the master cylinder 22 are understood to serve as a means for transmitting the treading force applied to the pedal.

On the side of the above-described dash panel 16 closer to the rear of the vehicle is disposed a pedal bracket 26 which swingably supports the brake pedal 10. The pedal bracket 26 is equipped with a substantially rectangular flat base plate 28 which forms a bearing surface for attaching the pedal bracket 26 to the dash panel 16. The pedal bracket 26 is also equipped with a pair of side plates 30 which extend parallel with each other from the vicinity of the sides of the base plate 28 substantially towards the rear of the vehicle. Stud bolts 38 protruding from the brake booster 20 through the inside of cylindrical collars 34, which are fixed to the front surface of the base plate 28 at the four corners thereof, are inserted through the pedal bracket 26. Nuts 40 are screwed onto the stud bolts 38 from the vehicle interior side thereby fixing the pedal bracket 26 to the dash panel 16. It should be noted that an unillustrated dash insulator is interposed between the dash panel 16 and the base plate 28 as a sound insulator.

The side plates 30 of the above-described pedal bracket 26 are both divided into two forks extending substantially towards the rear of the vehicle so that, when seen from the side, the side plates 30 substantially resemble a letter V shape lying on its side. The suspended-type brake pedal 10 is swingably supported by a pair of side uppers 30A disposed at the upper fork of the two forks of the side plate 30 described above.

The brake pedal 10 is constructed so as to include a pedal arm portion 42 formed by bending a thin plate material into a suitable shape, and a pedal pad 44 provided at the lower end portion of the pedal arm portion 42 serving as a treading surface to which treading force is applied by the foot of the driver. Additionally, a pedal boss 46 (refer to FIG. 2) which corresponds to the center of rotation of the pedal of the present invention is press fitted at a right angle to the surface of the pedal arm portion 42 at the upper end portion thereof. The pedal boss 46 is disposed in a state where it is inserted between the pair of side uppers 30A. A pair of unillustrated bushes are inserted into each end of the pedal boss 46, and an attaching bolt 48 is inserted from one of the side uppers 30A to protrude from the other side upper 30A. A stopper nut 50 is then screwed onto the end of the attaching bolt 48 thereby allowing the brake pedal 10 to be swingably supported by the pair of side uppers 30A in the manner described above.

It should be noted that unillustrated return springs are provided in the pedal arm portion 42, the clevis pin 62, and the main link 52 described below. This return spring constantly urges the brake pedal 10 to return to its initial position.

Figure 2:
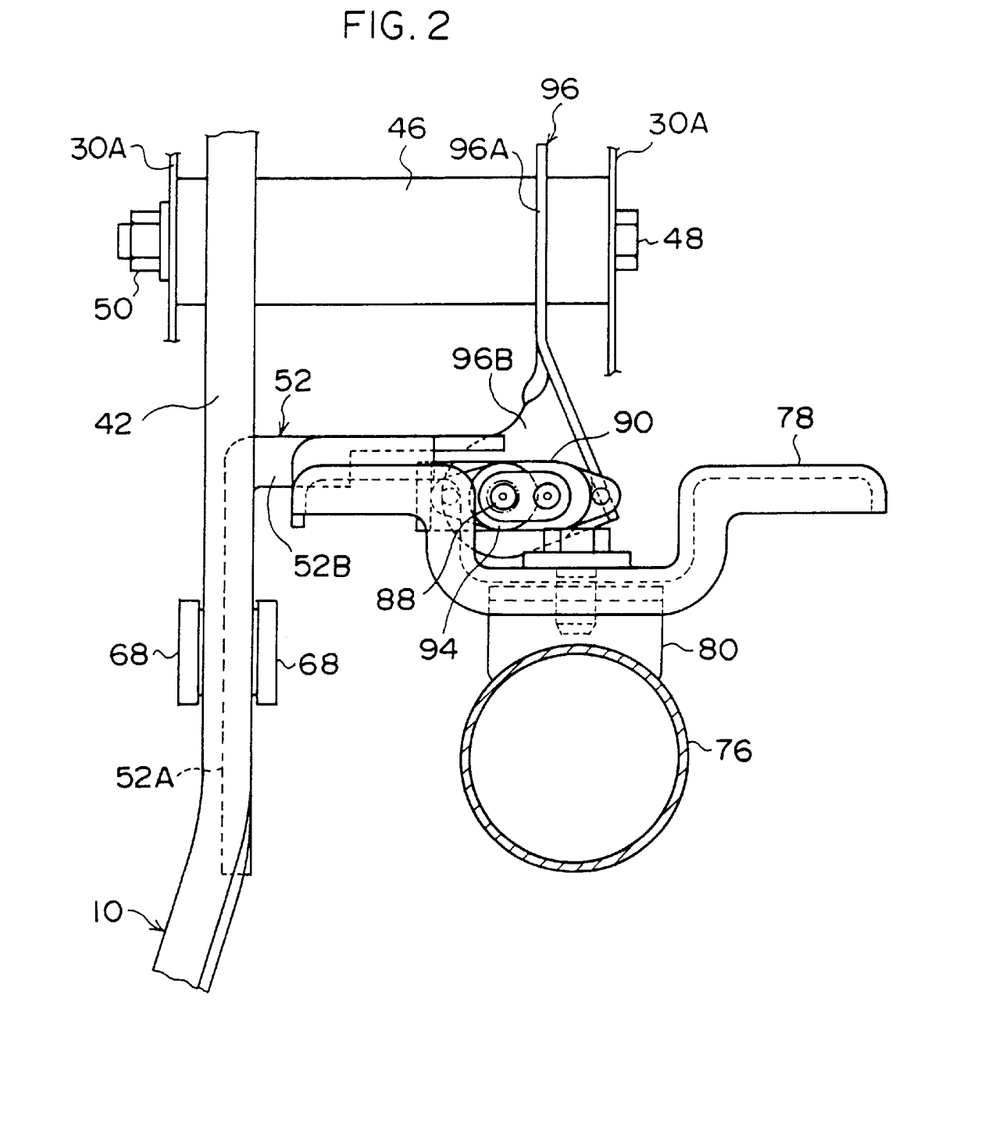
FIG. 2 is an enlarged back view illustrating the positional relationships between a brake pedal, a main link, a swinging bracket, a shift lock box, and other members shown in FIG. 1.
Figure 3:
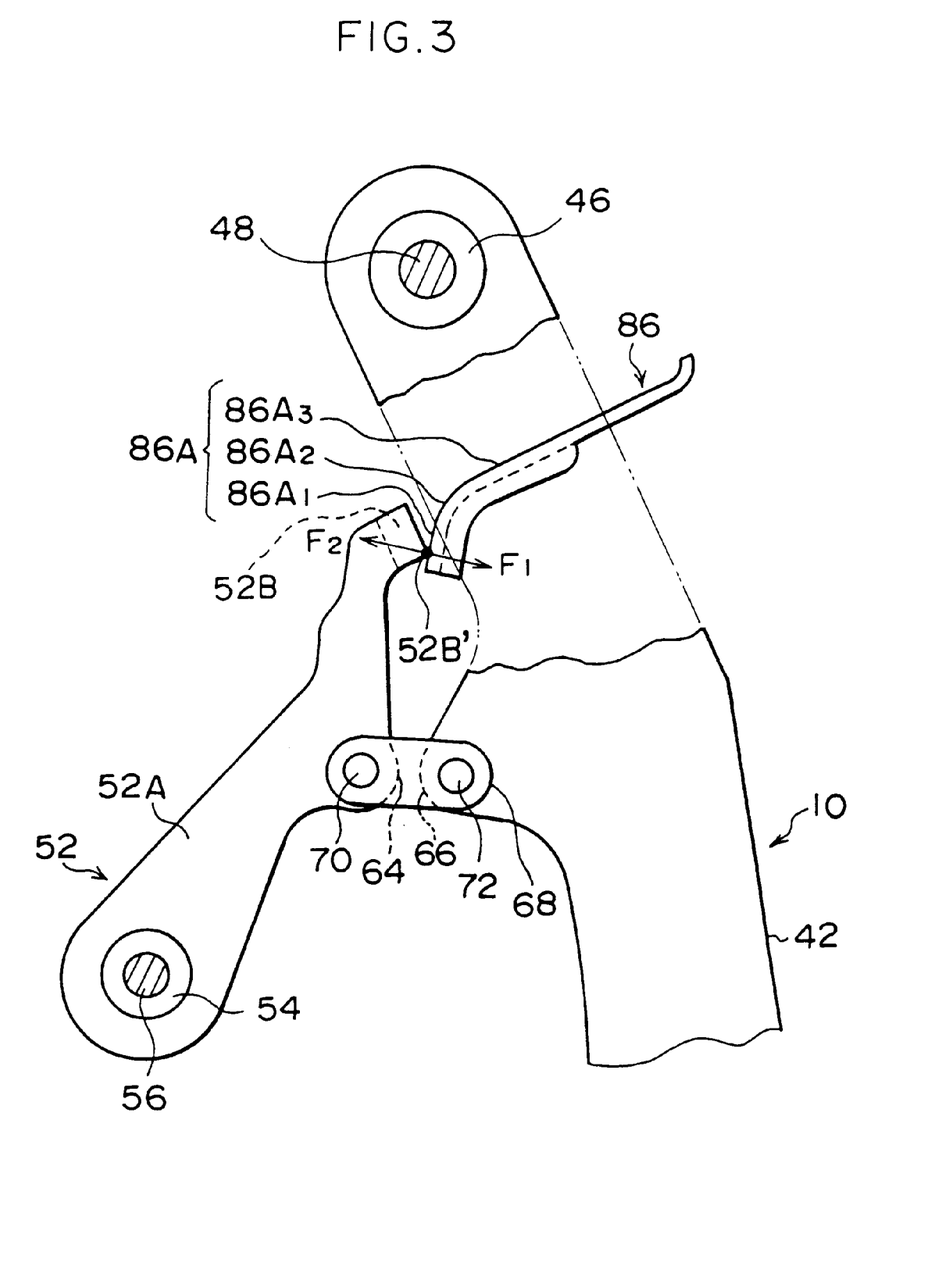
FIG. 3 is an enlarged side view of the main portions illustrating the behavior of each member during the initial stage of the application of the external force.
Figure 4:
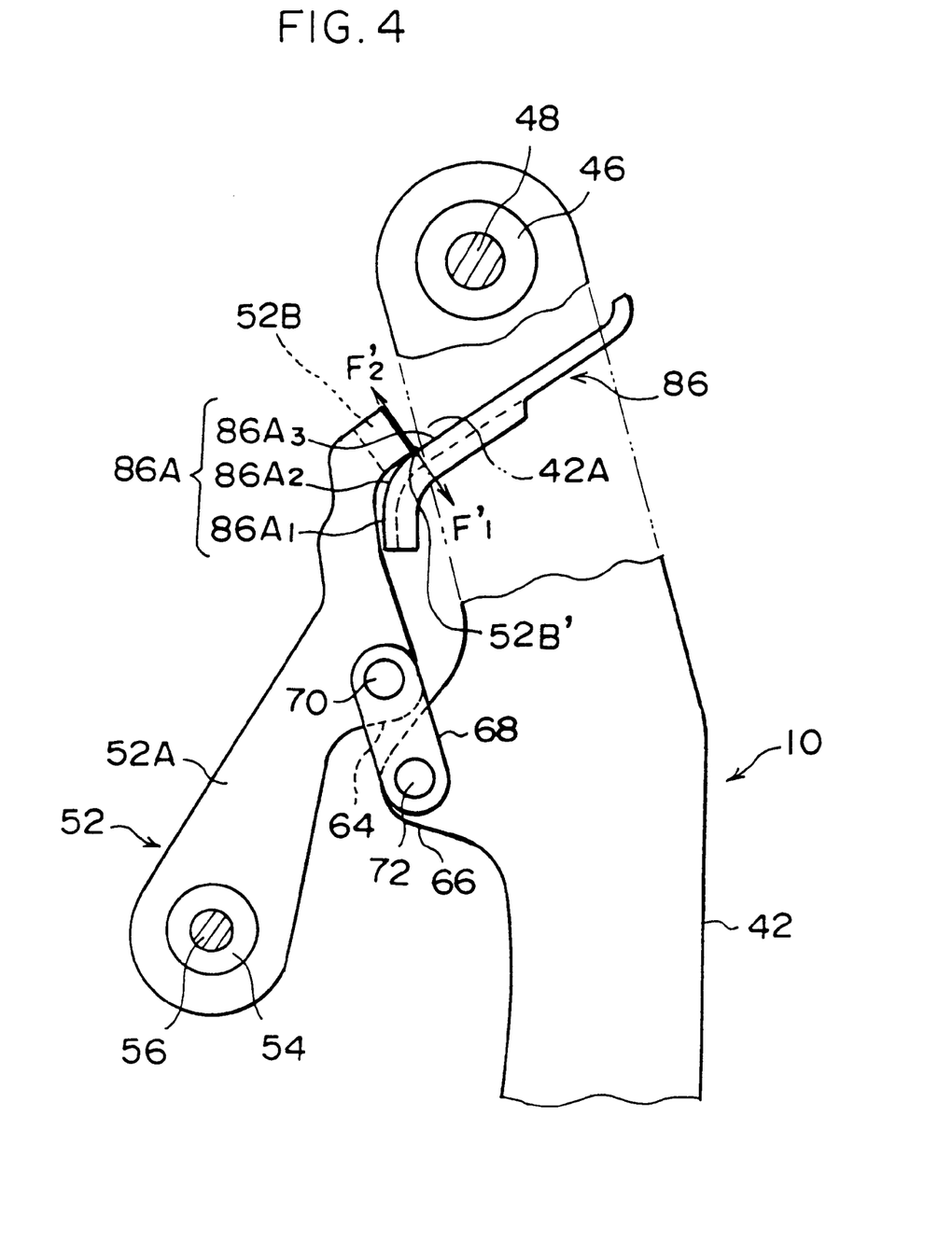
FIG. 4 is an enlarged view of the main portions illustrating the behavior of each member directly prior to the final stage of the application of an external force.

A main link 52 is swingably supported at a side lower 30B disposed at the lower fork of the two forks of the side plate 30. More specifically, as is shown in FIGS. 2 to 4, the main link 52 is disposed at the inside of the side lower 30B, and is constructed from a main portion 52A which extends along the surface of the side lower 30B substantially towards the top of the vehicle, and a curved portion 52B which curves from the upper end portion of the main portion 52A along the pedal boss 46. The bottom end portion of the main portion 52A is linked by a linking pin 56, via a bush 54, to the bottom end portion of one side lower 30B in a manner that allows it to swing (this linking pin 56 corresponds to the center of link rotation of the present invention).

Furthermore, the distal end of a push rod (operating rod) 58 protruding from the brake booster 20, serving as a means for transmitting the treading force applied to the pedal, is linked to the top portion of the main portion 52A of the main link 52 so as to be freely relatively rotated by a clevis 60 and a clevis pin 62. It should be noted that the clevis 60 is formed substantially in a U shape when seen from above and the main portion 52A of the main link 52 is inserted between both end portions thereof. The clevis pin is then inserted through both ends of the clevis as well as through the main link 52 and is held in place with a cotter pin or the like. The clevis 60 and the main portion 52A of the main link 50 are thus linked together.

A link projecting portion 64 projects from the intermediate portion in the longitudinal direction of the main portion 52A of the main link 52 substantially towards the rear of the vehicle. Corresponding to this, a pedal projecting portion 66 projects from the pedal arm portion 42 in a position opposite the link projecting portion 64 substantially towards the front of the vehicle. A rectilinear sub link 68, having the longitudinal direction thereof in substantially the longitudinal direction of the vehicle, is disposed so as to have one end thereof abutting the link projecting portion 64 and the other end thereof abutting the pedal projecting portion 66 and these ends are linked to the respective projecting portions by linking pins 70 and 72 respectively so as to be freely relatively rotatable.

Accordingly, the brake pedal 10 and the push rod 58 are linked mutually via the linking structure of the main link 52 and sub link 68 (this structure equates to the linking means of the present invention, with the main link 52 equating to the first link, and the sub link 68 equating to the second link). It should be noted that this type of brake pedal is called a link-type brake pedal and is employed in order that an optimum braking performance can be achieved by varying the amount of push of the push rod 58 relative to the pedal stroke.

Returning to FIG. 1, pipe-shaped instrument panel reinforcement 74 is disposed towards the rear of the brake pedal 10. This instrument panel reinforcement 74 is a conventionally disposed member with the longitudinal direction thereof in substantially the transverse direction of the vehicle. A steering support 78 for supporting the steering column 76 is fixed at a predetermined position in the longitudinal direction of the instrument panel reinforcement 74. Both the instrument panel reinforcement 74 and the steering support 78 are high strength members and correspond to the second vehicle body structural members of the present invention.

An attachment bracket 80, formed in a U shape when viewed from the side, is fixed in a position opposite the front end portion of the steering support 78 on the steering column 76. An additional supporting bracket 82, formed substantially in an L shape, is disposed between the attachment bracket 80 and the front end portion of the steering support 78. The front end portion of the steering support 78 is bolted by a fixing bolt 84 to the attachment bracket 80 which is fixed to the steering column 76 with the base portion 82A of the supporting bracket 82 sandwiched therebetween.

A plate-shaped extending portion 82B of the supporting bracket 82 extends from the base portion 82A towards the front of the vehicle. A plate-shaped pressing member 86, whose distal end 86A has been bent so as to hang downwards (also shown in FIG. 3), is disposed so as to abut against the bottom surface of the extending portion 82B. In addition, a shift lock box 90, which holds a shift lock cable 88 passing therethrough, is fixed by a pair of attachment bolts 92 to the bottom surface of the pressing member 86. The shift lock cable 88 is used for brake ON/OFF sensing, which is necessary in automatic vehicles. It should be noted that the shift lock cable 88 is press-urged in the direction in which it is elongated (namely, substantially towards the front of the vehicle) by an unillustrated urging means disposed inside the shift lock box 90. A disc-shaped abutting member 94 is fitted to the distal end portion of the shift lock cable 88, and a swinging bracket 96 is disposed in front of the abutting member 94.

As is shown in FIG. 2, this swinging bracket 96 is fixed at the opposite end of the pedal boss 46 to the brake pedal 10. It is constructed of an attachment portion 96A, which extends substantially towards the bottom of the vehicle, and a pressing member 96B, which bends from the bottom end of the attachment portion 96A towards the pedal arm portion 42. The pressing member 96B of the swinging bracket 96 is positioned so as to be able to abut against the abutting member 94 of the shift lock cable 88. When the brake pedal 10 is not being operated, the pressing member 96B of the swinging bracket 96 pushes back the abutting member 94 in resistance to the urging force of the above-described urging means, and when the brake pedal 10 is being operated, the pressing member 96B of the swinging bracket 96 allows the abutting member 94 (namely, the shift lock cable 88) to move forward (extend out) due to the urging force of the above-described urging means. It should be noted that the swinging bracket 96 and the shift lock box 90 correspond respectively to the moving member and the fixed member of the present invention. Therefore the shift lock box 90 is often provided near the brake pedal 10, and it is thus easy to use the shift lock box 90 as the fixed member.

It should also be noted that the above-described moving member may not only be provided as a separate member from the brake pedal 10, as in the present embodiment, but may also be integrated with the brake pedal 10, or may be the pedal arm portion 42 of the brake pedal 10 itself.

In the present embodiment, the aforementioned pressing member 86 is provided as a newly established member and is constructed so as to have a predetermined strength. Further, as is shown in FIGS. 3 and 4, the distal end portion 86A of the pressing member 86 is formed so as to curve downwards. More specifically, the distal end portion 86A of the pressing member 86 comprises a steeply sloped surface portion 86A₁, whose surface plane runs substantially in the vertical direction of the vehicle, an arcing surface portion 86A₂, which continues from the 86A₁ surface portion towards the rear, and a gently sloping surface portion 86A₃, which continues from the 86A₂ surface portion towards the rear in a forward tilt. The distal end portion 86A of the pressing member 86 having these three types of surfaces is disposed so as to be substantially opposite the vehicle rearwards side of the curved portion 52B of the aforementioned main link 52. It should be noted that the pressing member 86 equates to the displacement control means of the present invention.

The operation and effects of the present embodiment will now be explained.

Firstly, the working of the brake pedal 10 during normal operation will briefly be explained. When the driver applies a treading force to the pedal pad 44 of the brake pedal 10, the brake pedal 10 swings around the pedal boss 46 substantially in the forwards direction of the vehicle. Because of this, the main link 52, which is linked to the pedal arm portion 42 via the sub link 68 so as to be relatively rotatable, swings around the linking pin 56 substantially in the forwards direction of the vehicle. When the main link 52 is swung, the push rod 58, which is linked to the main portion 52A of the main link 52 via the clevis 60 so as to be relatively rotatable, is pressed (forced) substantially in the forwards direction of the vehicle. Accordingly, the treading force applied by the driver with his foot to the pedal pad 44 of the brake pedal 10, is augmented by the brake booster 20, and is then transmitted to the master cylinder 22 where it is designed to be converted into hydraulic pressure.

When an external force of a predetermined value or more acts on the front portion of a vehicle, the load at that instant may be input to the dash panel 16 via the master cylinder 22 and the brake booster 20. If this occurs, the dash panel 16 is displaced substantially towards the rear of the vehicle. Accordingly, the pedal bracket 26, which is fixed to the dash panel 16, is also displaced towards the rear of the vehicle. In contrast to this, because both the instrument panel reinforcement 74 and the steering support 78, which is attached thereto, are made from high strength materials, there is almost no displacement of these members towards the rear of the vehicle. Therefore, a relative displacement is generated in the longitudinal direction of the vehicle between the dash panel 16 and the instrument panel reinforcement 74 and steering support 78.

Here, as is shown in FIG. 3, when relative displacement is generated between the dash panel 16 and the instrument panel reinforcement 74 and steering support 78, then the bottom end portion 52B' of the curved portion 52B of the main link 52 abuts against the distal end portion 86A of the pressing member 86 fixed to the steering support 78. Because this distal end portion 86A comprises in succession from the front a steeply sloped surface portion 86A₁, an arcing surface portion 86A₂, and a gently sloping surface portion 86A₃, during the initial stage of the action of an external force, the bottom end 52B' of the main link 52 abuts against the steeply sloped surface portion 86A₁. Then, as the relative displacement between the dash panel 16 and the steering support 78 advances (in other words, the distance between the two decreases), the bottom end 52B' is driven from the steeply sloped surface portion 86A₁ up onto the arcing surface portion 86A₂ directly before the final stage of the action of the external force, as is shown in FIG. 4.

In this process, the main link 52 receives a thrusting-up force from the pressing member 86 and swings substantially towards the front of the vehicle around the linking pin 56. Together with this, the pedal arm portion 42 of the brake pedal 10 receives a rotational force around the pedal boss 46 substantially towards the front of the vehicle via the sub link 68. As a result, the pedal pad 44 of the brake pedal 10 is displaced rotationally around the pedal boss 46 substantially towards the front of the vehicle. In other words, according to the present embodiment, when an external force of a predetermined amount or more acts on the front portion of a vehicle, it becomes possible to control the pedal pad 44 of the brake pedal 10 so that it is displaced substantially towards the front of the vehicle. As a result, it becomes possible to suppress the bending of the knees of the driver caused by inertial movement in the event that an external force or a predetermined amount or more acts on the front portion of a vehicle. Consequently, it is possible to keep the knees of the driver away from the steering column 76.

The basic operation and effects of the present embodiment are as described above. Below are described further operations and effects of the present embodiment.

Firstly, according to the present embodiment, as a result of the shape of the distal end portion 86A of the pressing member 86, as the main link 52 swings around the linking pin 56 (in other words, as the process proceeds from the initial stage of the action of an external force (the state shown in FIG. 3) to directly before the final stage of the action of the external force (the state shown in FIG. 4)), the direction, in which the pressing force acting between the bottom end portion 52B' of the main link 52 and the distal end portion 86A of the pressing member 86 acts, gradually changes.

Namely, in the initial stage of the action of the external force, the direction of the action of the pressing force from the bottom end 52B' of the main link 52 towards the distal end portion 86A of the pressing member 86 is substantially towards the rear of the vehicle (the direction shown by the arrow $F_1$ in FIG. 3). However, immediately before the final stage of the action of the external force, the direction of the action of the pressing force from the bottom end 52B' of the main link 52 towards the distal end portion 86A of the pressing member 86 changes substantially towards the bottom of the vehicle (the direction shown by the arrow $F_1'$ in FIG. 4). Conversely, in the initial stage of the action of the external force, the direction of the action of the pressing force (the abutment reaction force) from the distal end portion 86A of the pressing member 86 towards the bottom end portion 52B' of the main link 52 is substantially towards the front of the vehicle (the direction shown by the arrow $F_2$ in FIG. 3). However, immediately before the final stage of the action of the external force, the direction of the action of the pressing force from the distal end portion 86A of the pressing member 86 towards the bottom end 52B' of the main link 52 changes substantially towards the top of the vehicle (the direction shown by the arrow $F_2'$ in FIG. 4). It should be noted that the above-described lines $F_1$, $F_2$, $F_1'$, and $F_2'$ of the direction of the action of the pressing force are lines in the vertical direction from the surface of the pressing member 86 at the point where the bottom edge portion 52B' abuts against the pressing member 86.

To explain still further, when compared with the present embodiment, a member in which the pressing member 86 only has the portion corresponding to the steeply sloped surface portion $86A_1$ of the present embodiment (for example, a member whose continuously extending surface has only the same angle as the steeply sloping surface portion $86A_1$ of the distal end portion of the pressing member 86 of the present embodiment), the effectiveness of the pressing force transmitted from the pressing member 86 to the main link 52 (the ratio of the displacement of the pressing member 86 relative to the main link 52 to the displacement of the instrument panel reinforcement 74 relative to the dash panel 16) gradually deteriorates. Because of this, the reaction force transmitted to the pressing member 86 is steadily reduced in the present embodiment, as compared with the above-mentioned example. It should be noted that as a prerequisite for obtaining the above-described action, it is necessary for the distal end portion 86A of the pressing member 86 to be inside a range where it interferes with (abuts against) the main link 52 in the event that an external force of a predetermined amount or more acts upon the front portion of a vehicle.

From the above explanation, the above-described direction of the action of the pressing force can be optionally controlled through the shape of the distal end portion 86A of the pressing member 86 and, as a result, the load input to the steering support 78 and the steering column 76 can be easily reduced.

To supplement, the angle of the steeply sloping surface $86A_1$ of the distal end portion 86A of the pressing member 86 is set to be substantially vertical so as to ensure that the surface $86A_1$ abuts against the bottom end portion 52B'. Accordingly, the load input to the steering column 76 substantially towards the rear of the vehicle via the pressing member 86 is relatively large, however, because of the arcing surface portion $86A_2$, the bottom end 52B' can be reliably pushed up and the load input to the steering column 76 substantially towards the rear of the vehicle via the pressing member 86 can be steadily reduced. In addition, as is explained below, because of the gently sloping surface portion $86A_3$, the load input to the steering column 76 via the pressing member 86 can be lessened with certainty. In other words, the three different surfaces of the distal end portion 86A of the pressing member 86 have been designed with different meanings and for different purposes.

It should be noted that optional changes can be employed for the changes in the surface of the above-described pressing member 86. For example, if the gently sloping surface $86A_3$ of the present embodiment is curved to slope progressively downwards as the surface approaches the rear of the vehicle, the pressing force against the main link 52 (as well as the reaction thereto) can be almost completely eliminated. Moreover, it obviously follows that by adjusting the angle of the gently sloping surface portion $86A_3$, the pressing force can be optionally adjusted.

Secondly, in the present embodiment, when the bottom end portion 52B' of the curved portion 52B of the main link 52 is driven from the steeply sloping surface portion $86A_1$ of the pressing member 86 up onto the arcing surface portion $86A_2$, the pressing portion 96B of the swinging bracket 96 fixed to the pedal boss 46 and the shift lock box 90 housing the shift lock cable 88 therein are positioned relative to each other so as to interfere with each other (more accurately, the pressing portion 96B and the distal end portion of the shift lock box 90 interfere with each other via the abutment member 94 which is sandwiched between the two. However, in the present embodiment, because the swinging bracket 96 has a cross section substantially formed in an L shape comprising an attachment portion 96A, which is fixed to the pedal boss 46, and a pressing portion 96B, which is bent out from the attachment portion 96A, if the above-described mutual interference occurs, then the pressing portion 96B, which has one end thereof supported by the attachment portion 96A, is more easily deformed by bending. Accordingly, the load which acts at the time of this mutual interference is absorbed by this deformation. As a result, according to the present embodiment, the load input to the steering column 76 can be reduced even further.

Thirdly, in the explanation of the basic operation of the present embodiment given above, the process was explained as far as the point directly before the final stage. However, once this process has been completed, the bottom end portion 52B' of the curved portion 52B of the main link 52 moves from the arcing surface portion $86A_2$ of the distal end portion 86A of the pressing member 86 to the gently sloping surface portion $86A_3$ thereof. At a predetermined position inside the area of the gently sloping surface $86A_3$, the bottom end portion 52B' of the main link 52 is abutted against the upper front end surface 42A (refer to FIG. 4) of the pedal arm portion 42 of the brake pedal 10. In other words, a limit is set on the swinging movement of the main link 52 by the brake pedal 10. Because of this, the main link 52 and the sub link 68 can be prevented from swinging any more than is necessary. As a result, the main link 52 and the sub link 68 can be prevented from going against their natural direction and being rotationally displaced in the reverse direction (i.e. in the reverse direction to that in which the pedal is operated which is the direction the pedal moves in when the brake is released). As can be understood from this explanation, the above-mentioned upper front end surface 42A of the pedal arm portion 42 equates to the regulating means of the present invention.

It should be noted that, in the present embodiment, the bottom end portion of the main portion 52A of the main link 52 was connected to the side lower 30B of the pedal bracket 26, however, the present invention is not limited to this and a structure may be employed where the bottom end portion of the main body 52A is linked to the dash panel 16 via a bracket.

Further, in the present embodiment, the swinging bracket 96 was formed with a structure wherein, in the event that an external force of a predetermined value or more acts on the front portion of the vehicle and the swinging bracket 96 and the shift lock box 90 interfere with each other, then the swinging bracket 96 is deformed by bending. However, the present invention is not limited to this and a structure where the shift rod box 90 which is fixed to the steering column 76 is deformed by buckling, or a structure where the swinging bracket 96 and the shift lock box 90 are both deformed may be employed.

In addition, in the present embodiment, the linking means was constructed from a main link 52 connected to a push rod 58, and a sub link 68 connecting the main link 52 and the brake pedal 10, however, the present invention is not limited to this and any suitable structure may be used provided that the function of the invention is fulfilled. For example, by altering the shapes of the pedal projecting portion 66 of the brake pedal 10 and the link projecting portion 64 of the main link 52 so as to overlap each other, and by forming holes of different diameters respectively in the pedal projecting portion 66 and the link projecting portion 64, then if the portions are joined by a linking pin after forming a structure where the difference in the stroke can be absorbed by an elastic body or the like, the sub link 68 can be removed completely. Conversely, the link means may be constructed from a combination of three or more links.

In the present embodiment, the present invention was applied to a suspended-type main brake pedal, however, the present invention is not limited to this and may also be applied to other vehicle pedals such as a suspended-type clutch pedal.

As has been explained above, the structure for controlling the displacement of a vehicle pedal according to claim 1 of the present invention comprises a structure wherein a suspended-type vehicle pedal is linked to a treading force transmission member via a linking means, and wherein the structure for controlling the displacement of a vehicle pedal is supported at a second vehicle body structural member which is disposed further towards the rear of the vehicle than said first vehicle body structural member and whose rigidity in the longitudinal direction of the vehicle is higher than that of the vehicle body structural member, which relatively presses said linking means in the direction in which the pedal is operated through the relative displacement which arises between said first vehicle body structural member and said second vehicle body structural member, thereby displacing said treading surface of the vehicle pedal substantially towards the front of the vehicle. Therefore, the structure for controlling the displacement of a vehicle pedal possesses the excellent effect that the displacement of the treading surface of a vehicle pedal, in the event that an external force of a predetermined value or more acts upon the front portion of the vehicle, can be controlled.

The structure for controlling the displacement of a vehicle pedal according to the second aspect of the present invention comprises the structure according to the first aspect of the present invention, wherein the aforementioned displacement control means is a pressing member supported at the second vehicle body structural member and wherein;

the direction of the action of the pressing force between said linking means and said pressing member changes in accordance with the rotational displacement of said linking means around the center of rotation of the link which is caused by said linking means being relatively pressed by the pressing member. Therefore, the pressing force which acts from the pressing member to the linking means, and the pressing force which acts from the linking means to the pressing member (and, in turn, the second vehicle body structural member) can be optionally controlled. As a result, the excellent effect is produced that the load which is input to the second vehicle body structural member can be reduced.

The structure for controlling the displacement of a vehicle pedal according to the third aspect of the present invention comprises the structure according to the first and second aspects of the present invention, wherein a moving member is provided at the aforementioned vehicle pedal to move in accordance with the swinging of a vehicle pedal, and a fixed member is fixed to the second vehicle body structural member to conduct a predetermined operation which uses the movement of the moving member. When a relative displacement arises between the first vehicle body structural member and the second vehicle body structural member thereby causing the moving member and the fixed member to interfere with each other, at least one of the moving member and the fixed member is capable of deforming. Therefore, the load which acts at the time of the mutual interference is able to be absorbed by the deformation resulting in the excellent effect that the load which is input to the second vehicle body structural member is able to be reduced even further The structure for controlling the displacement of a vehicle pedal according to the fourth aspect of the present invention comprises the structure according to the first through third aspects of the present invention, wherein the aforementioned linking means comprises a first link which has a center of rotation of the link in either the pedal bracket or the first vehicle body structural member and which is linked so as to be rotatable relative to the treading force transmission member, and a second link which links the first link rotatably with the vehicle pedal. When a relative displacement arises between the first vehicle body structural member and the second vehicle body structural member, a regulating means is provided for preventing the first link from being rotationally displaced in the reverse direction to that in which the pedal is operated. Therefore, an excellent effect is produced in that linking means which comprises a first link and a second link can be prevented from rotationally displacing away from its normal operating direction (namely, in the reverse direction to that when the pedal is depressed by a driver).

What is claimed is:

1. A structure for controlling the displacement of a vehicle pedal comprising:

a pedal bracket fixed to a first vehicle body structural member which displaces in substantially the rearward direction of a vehicle when an external force of a predetermined value or more acts on the front portion of the vehicle;

a suspended-type vehicle pedal which is swingably supported by said pedal bracket and which is provided with a treading surface at the bottom end thereof to which a treading force is applied by the foot of the driver;

a treading force transmission member which transmits said treading force applied to said treading surface of the vehicle pedal towards a hydraulic conversion means;

linking means for linking said vehicle pedal and said treading force transmission member, which has a center of rotation of the link which is independent of the center of rotation of said vehicle pedal, and which presses said treading force transmission member, which is rotationally displaced around the center of rotation of the link in accordance with the swinging of said vehicle pedal, in the direction in which said pedal is operated when a treading force is applied to said treading surface of the vehicle pedal; and displacement control means, which is supported at a second vehicle body structural member which is disposed further towards the rear of the vehicle than said first vehicle body structural member and whose rigidity in the longitudinal direction of the vehicle is higher than that of said first vehicle body structural member, which relatively presses said linking means in the direction in which the pedal is operated through the relative displacement which arises between said first vehicle body structural member and said second vehicle body structural member, thereby displacing said treading surface of the vehicle pedal substantially towards the front of the vehicle.

2. A structure for controlling the displacement of a vehicle pedal according to claim 1, wherein said displacement control means is a pressing member supported at said second vehicle body structural member, and wherein the direction of the action of the pressing force arising between said linking means and said pressing member changes in accordance with the rotational displacement of said linking means around the center of rotation of the link which is caused by said linking means being relatively pressed by said pressing member.

3. A structure for controlling the displacement of a vehicle pedal according to claim 2, wherein the direction of the action of the pressing force arising between said linking means and said pressing member changes to a direction in which the load, input by the pressing force substantially towards the rear of the vehicle, is decreased.

4. A structure for controlling the displacement of a vehicle pedal according to claim 2, wherein said pressing member have a bent member, the bent member including at least one bent portion.

5. A structure for controlling the displacement of a vehicle pedal according to claim 2, wherein said pressing member have a bent member, the bent member including a plurality of bent portions whose way of bending are different each other.

6. A structure for controlling the displacement of a vehicle pedal according to claim 5, wherein the bent member includes a bent portion bent in a direction which ensures abutting said linking means thereagainst when the relative displacement arises between said first vehicle body structural member and said second vehicle body structural member.

7. A structure for controlling the displacement of a vehicle pedal according to claim 5, wherein the bent member includes a bent portion bent in a direction which ensures decreasing a load, input by the pressing force which arises between said linking means and said pressing member, substantially towards the rear of the vehicle.

8. A structure for controlling the displacement of a vehicle pedal according to claim 5, wherein the bent member includes a bent portion whose cross section has a substantially circular arc shape so that a direction of the action of the pressing force which arises between said linking means and said pressing member progressively changes.

9. A structure for controlling the displacement of a vehicle pedal according to claim 1, further comprising:

a moving member, provided at said pedal bracket, which moves in accordance with the swinging of said vehicle pedal; and a fixed member, fixed at said second vehicle body structural member, which causes a predetermined operation using the movement of the moving member, wherein when a relative displacement arises between said first vehicle body member and said second vehicle body member thereby causing said moving member and said fixed member to interfere with each other, at least one of said moving member and said fixed member is capable of deforming.

10. A structure for controlling the displacement of a vehicle pedal according to claim 9, wherein said moving member have a pressing portion which deforms when a relative displacement arises between said first vehicle body member and said second vehicle body member thereby causing said moving member and said fixed member to interfere with each other.

11. A structure for controlling the displacement of a vehicle pedal according to claim 1, further comprising:

regulating means for preventing said vehicle pedal from rotationally displacing in the reverse direction to that in which the pedal is operated when a relative displacement arises between said first vehicle body structural member and said second vehicle body structural member.

12. A structure for controlling the displacement of a vehicle pedal according to claim 11, wherein said linking means comprises:

a first link which has the center of rotation of the link in either the pedal bracket or in the first vehicle body structural member and which is linked so as to be rotatable relative to the treading force transmission member; and a second link which links the first link rotatably to the vehicle pedal, wherein, when a relative displacement arises between said first vehicle body structural member and said second vehicle body structural member, said first link is prevented from rotationally displacing in the reverse direction to that in which the pedal is operated by abutting against said regulating means.

13. A structure for controlling the displacement of a vehicle pedal comprising:

a pedal bracket fixed to a first vehicle body structural member which displaces in substantially the rearward direction of a vehicle when an external force of a predetermined value or more acts on the front portion of the vehicle;

a suspended-type vehicle pedal which is swingably supported by said pedal bracket and which is provided with a treading surface at the bottom end thereof to which a treading force is applied by the foot of the driver;

a treading force transmission member which transmits said treading force applied to said treading surface of the vehicle pedal towards a hydraulic conversion means;

linking means for linking said vehicle pedal and said treading force transmission member, which has a center of rotation of the link which is independent of the center of rotation of said vehicle pedal, and which presses said treading force transmission member, which is rotationally displaced around the center of rotation of the link in accordance with the swinging of said vehicle pedal, in the direction in which said pedal is operated when a treading force is applied to said treading surface of the vehicle pedal; and displacement control means, which is supported at a second vehicle body structural member which is disposed further towards the rear of the vehicle than said first vehicle body structural member and whose rigidity in the longitudinal direction of the vehicle is higher than that of said first vehicle body structural member, which relatively presses said linking means in the direction in which the pedal is operated through the relative displacement which arises between said first vehicle body structural member and said second vehicle body structural member, thereby displacing said treading surface of the vehicle pedal substantially towards the front of the vehicle, wherein said displacement control means is a pressing member supported at said second vehicle body structural member, and wherein the direction of the action of the pressing force arising between said linking means and said pressing member changes in accordance with the rotational displacement of said linking means around the center of rotation of the link which is caused by said linking means being relatively pressed by said pressing member.

14. A structure for controlling the displacement of a vehicle pedal according to claim 13, wherein said pressing member have a bent member, the bent member including a plurality of bent portions whose way of bending are different each other.

15. A structure for controlling the displacement of a vehicle pedal according to claim 14, wherein the bent member includes a bent portion bent in a direction which ensures abutting said linking means thereagainst when the relative displacement arises between said first vehicle body structural member and said second vehicle body structural member.

16. A structure for controlling the displacement of a vehicle pedal according to claim 14, wherein the bent member includes a bent portion bent in a direction which ensures decreasing a load, input by the pressing force which arises between said linking means and said pressing member, substantially towards the rear of the vehicle.

17. A structure for controlling the displacement of a vehicle pedal according to claim 14, wherein the bent member includes a bent portion whose cross section has a substantially circular arc shape so that a direction of the action of the pressing force which arises between said linking means and said pressing member progressively changes.

18. A structure for controlling the displacement of a vehicle pedal according to claim 13, further comprising:

a moving member, provided at said pedal bracket, which moves in accordance with the swinging of said vehicle pedal; and a fixed member, fixed at said second vehicle body structural member, which causes a predetermined operation using the movement of the moving member, wherein when a relative displacement arises between said first vehicle body member and said second vehicle body member thereby causing said moving member and said fixed member to interfere with each other, at least one of said moving member and said fixed member is capable of deforming.

19. A structure for controlling the displacement of a vehicle pedal according to claim 13, further comprising:

regulating means for preventing said vehicle pedal from rotationally displacing in the reverse direction to that in which the pedal is operated when a relative displacement arises between said first vehicle body structural member and said second vehicle body structural member.

20. A structure for controlling the displacement of a vehicle pedal according to claim 19, wherein said linking means comprises:

a first link which has the center of rotation of the link in either the pedal bracket or in the first vehicle body structural member and which is linked so as to be rotatable relative to the treading force transmission member; and a second link which links the first link rotatably to the vehicle pedal, wherein, when a relative displacement arises between said first vehicle body structural member and said second vehicle body structural member, said first link is prevented from rotationally displacing in the reverse direction to that in which the pedal is operated by abutting against said regulating means.

21. A structure for controlling the displacement of a vehicle pedal according to claim 9, wherein said fixed member is a shift lock box.

* * * * *